United States Patent [19]

Eberle

[11] 4,203,699
[45] May 20, 1980

[54] METHOD OF DUMPING AND COLLECTING CORROSIVE SUBSTANCES FROM AUTOMOTIVE BATTERIES

[75] Inventor: William J. Eberle, Reading, Pa.

[73] Assignee: General Battery Corporation, Reading, Pa.

[21] Appl. No.: 866,515

[22] Filed: Jan. 3, 1978

Related U.S. Application Data

[62] Division of Ser. No. 669,216, Mar. 22, 1976, Pat. No. 4,081,093.

[51] Int. Cl.$^2$ ............................................. B65G 65/30
[52] U.S. Cl. ................................... 414/415; 414/421
[58] Field of Search .............. 214/152, 300, 302, 313, 214/314, 312, 308, 1 Q, 340; 414/415, 421

[56] References Cited

U.S. PATENT DOCUMENTS

| | | | |
|---|---|---|---|
| 1,967,683 | 7/1934 | Ostrander | 214/312 |
| 2,988,239 | 6/1961 | Miller et al. | 214/312 |
| 3,167,196 | 1/1965 | Eberle | 214/308 |
| 3,192,875 | 7/1965 | Kroeger et al. | 214/308 |

Primary Examiner—Lawrence J. Oresky
Attorney, Agent, or Firm—Benasutti Associates, Ltd.

[57] ABSTRACT

A novel battery dumping apparatus is described which is uniquely suited for dumping corrosive substances, such as battery acid, simultaneously from a number of automotive batteries. The novel apparatus generally comprises a sealed tube adapted for rotation through an arc of less than 360 degrees. Within the tube are disposed two parallel spaced apart baffles which together form a sealed battery processing channel. This battery processing channel is pierced by a plurality of rods disposed in a plane which bisects the aforementioned baffles. These rods are ultimately caused to rotate in opposite directions by a gear drive disposed outside of said battery processing channel but within said tubular member. These gears are, in turn, caused to drive said rods by a pneumatic motor which is mounted outside of said tubular member. A plurality of roller members, one for each rod, are disposed within the battery processing channel, alternate ones of said rollers being pinned to their respective rods to produce movement of batteries resting thereon. Four unitary inflatable members are appropriately positioned on the aforementioned baffles for the purpose of selectively gripping groups of batteries to be inverted. A novel hydraulic piston is utilized as a safety interlock to prevent batteries in the inverted position from being released by these tubular gripping means.

These gripping means further coact with the battery processing channel to prevent latent liquids from showering down upon batteries during the inversion process. Additionally, novel sealing and pouring means disposed at opposite ends of the tubular member provide for safe collection of the dumped corrosive liquids.

1 Claim, 10 Drawing Figures

METHOD OF DUMPING AND COLLECTING CORROSIVE SUBSTANCES FROM AUTOMOTIVE BATTERIES

This is a division of application Ser. No. 669,216, filed Mar. 22, 1976, now U.S. Pat. No. 4,081,093 issued Mar. 28, 1978.

BACKGROUND OF THE INVENTION

The present invention relates generally to apparatus for dumping liquids from automotive batteries in a production line setting, and more particularly, to those apparatuses specifically designed for dumping corrosive liquids from groups of automotive batteries in a production line situation.

It is well known in the prior art to invert a plurality of containers travelling in a production line for labelling or dumping purposes. For example, U.S. Pat. No. 2,226,068 dated Dec. 24, 1940 entitled "Machine for Feeding Cans to Labelling Machines" describes a system for inverting tin cans. Similarly, U.S. Pat. No. 2,836,281 dated May 27, 1958 and entitled "Conveyor System" describes an apparatus intended primarily to invert filled bottles of beverage for the purpose of insuring proper mixture of their contents. Finally, in U.S. Pat. No. 2,865,411 dated Dec. 23, 1958 and entitled "Container Inverting Machine" an apparatus is described for inverting containers for washing or rinsing and particularly which is used to rinse and drain containers such as open topped jars which have already been filled with olives or similar food products.

Other apparatuses in the prior art relate to various dumping, inverting or tilting processes. In U.S. Pat. No. 2,766,469 dated Oct. 16, 1956 entitled "Automatic Chainer" a device is described which facilitates the tilting of drums which are being cleaned by an operation which is termed "chaining". In U.S. Pat. No. 2,756,883 dated July 31, 1956 entitled "Vat Lifting and Dumping Truck" an apparatus is described for hoisting, transporting and tilting barrel-like containers. This patent, and certain others described hereinafter, utilize inflatable means in order to engage the particular work piece. For example, U.S. Pat. No. 2,609,113 dated Sept. 2, 1952 entitled "Fork Structure for Lift Trucks and Hoists" relates to the use of an inflatable means described as "Expansible Grip Elements for the Tines of a Fork for a Lift Fork Which Can Apply a Uniform Gripping Pressure to a Series or Bricks or Similar Articles to Lift the Bricks and Other Bricks Stacked Upon Those Engaged by the Grips". In U.S. Pat. No. 3,056,625 dated Oct. 2, 1962 entitled "Lifting Device" a pneumatically expansible device is used to displace a pivotally mounted member adapted to engage the product to be lifted.

Although the above described patents do not relate specifically to the area of battery dumping apparatuses, more recently, apparatuses intended to invert batteries have been developed. U.S. Pat. No. 3,863,775 dated Feb. 4, 1975 and entitled "Method and Apparatus for Inverting Operations Associated with the Assembly of a Storage Battery" and owned by the assignee of the present invention, describes a hand operated apparatus intended primarily to invert the lead containing battery casing component and fit it onto an inverted lid component which has adhesive applied thereto, so as to join the components without seepage or dripping of any adhesive into the battery cells. Another battery inverting device is described in U.S. Pat. No. 2,988,239 dated June 13, 1961 entitled "Battery Acid Dumper". This patent generally relates to a machine for dumping acid from batteries, and particularly relates to a machine capable of handling two groups of batteries at a time wherein acid may be dumped from one group of batteries while the previously dumped group of batteries is removed from the machine and is replaced with another group of batteries intended for subsequent dumping. This apparatus is generally comprised of a hemi-cylindrical vat which is disposed under a pivoted conveying mechanism comprised generally of two parallel roller conveyors and a plurality of battery guide support frames, including a pair of side structures which are positioned adjacent the respective sides of the conveyor which are intended to engage and hold the batteries in the inverted position.

In U.S. Pat. No. 3,167,196 dated Jan. 16, 1965 entitled "Battery Aqualizing Apparatus" and owned by the assignee of the present invention, an apparatus is described which provides inflatable battery gripping members which firmly but gently grip various sized and shaped batteries and which includes means for inverting the batteries for draining the water (or other chemicals) therefrom, and because of the resilient action of the inflated means, shake the battery on inverting and thereby prevent the retention of water inside the battery. Very generally, this patent discloses an improvement in a battery aqualizing apparatus for a battery emptying assembly which includes a rotatable support means, conveyor means for moving the batteries into and out of the emptying assembly and is connected to and supported by the rotatable support means, an elongate inflatable battery gripping member positioned along each edge of the conveyor means and carried by the rotatable support, whereby batteries on the conveyor may be gripped between the gripping members when they are inflated, and means for inverting the rotatable support thereby emptying the batteries held between the gripping members the inflated gripping members.

SUMMARY OF THE INVENTION

The present invention is an improvement on the apparatus described in U.S. Pat. No. 3,167,196.

During the manufacture of conventional automotive storage batteries, it may be required to dump corrosive substances from those batteries, such as when forming is completed and the relatively lower specific gravity forming acid is to be dumped in preference to higher specific gravity "finishing acid" which is subsequently to be introduced into the batteries. Certain problems are encountered in the dumping of acid from batteries in a production line which arise primarily from the corrosive nature of the liquids which are to be dumped. In particular, great care must be exercised in order to prevent acid from being introduced into the processing room, as well as to prevent dumped acid from spilling upon the exterior of the batteries during processing. Finally, means should be provided to collect the dumped acid to allow that acid to be recycled or otherwise disposed of in an environmentally acceptable manner. These ends must be accomplished while at the same time ensuring that the batteries themselves are emptied as much as possible so that the higher specific gravity "finishing acid" is not unduly diluted by the generally lower specific gravity forming acid which is residually retained in the dumped battery.

The present invention provides a battery dumping apparatus which is extremely safe and durable. The apparatus generally comprises a substantially tubular member in which are disposed two parallel spaced apart baffles. The longitudinal edges of these baffles form an acid proof seal with the interior of the tubular member to define a battery processing chamber. This battery processing chamber is bisected by a single line of roller conveyors which pierce and are sealed with respect to the baffles. The tubular member is mounted for rotation in an arc of approximately 180 degrees in such a way that the gearing and drive portions of the mechanism are always disposed on the hemispherical portion of that tubular member which is generally at or above a horizontal plane longitudinally bisecting that member. As a result, it is virtually impossible for dumped or residual corrosive materials to come in contact with, and thereby corrode, the gearing mechanism powering the advance of the batteries within the tubular member. While the roller conveyor gear drive is disposed outside of the battery processing channel and within an "acid proof" passage within the tubular member, additional protection is provided to the conveyor motor by disposing that motor externally of the tubular member. Also disposed within the battery processing chamber are four substantially tubular inflatable members which are sealed against the baffles in such a manner that residual acid retained by the inner surfaces of the battery processing chamber are caught and funneled towards the end of the apparatus intended to pour off the dumped acid. Seals are provided at alternate adjacent ends of the tubular member which prevent unwanted spillage of dumped acid from the apparatus, except at the discharge end wherein a pouring spout and acid drip feature are provided which additionally protect the exterior of the drum from acid contamination.

The device is pneumatically operated and further comprises novel control features which include a safety interlock preventing those batteries engaged in the inverted position from being accidentally dropped due to the deflation of the appropriate expansible tubular members. Furthermore, all pneumatic lines extending from the control apparatus are carefully disposed within acid proof cavities, preventing those lines from coming under corrosive attack from the dumped material. Finally, a novel air injection means is provided allowing for an acid proof interconnection between the inflatable tubular members disposed on the interior of the battery processing chamber and the pneumatic lines disposed within adjacent acid proof channels. The tubular member of the preferred embodiment of the present invention is supported for rotation through approximately 180 degrees by a novel tracking means comprising a plurality of rubber tires and at least one longitudinal tracking assembly. The use of rubber tires which cause the tubular member to rotate until bracket steps are engaged by the tires provides for the additional shaking of the device, which shaking helps to dislodge acid from the interstices of the batteries to be dumped.

Accordingly, a primary object of the present invention is the provision of a safe and reliable battery dumping apparatus for use with corrosive liquids.

Another object of the present invention is the provision of a substantially tubular battery dumping apparatus having a sealed battery processing chamber disposed therein.

A further object of the present invention is the provision of a battery dumping apparatus, the design of which minimizes the likelihood that either the apparatus or the batteries to be processed will be damaged or contaminated by corrosive liquids to be dumped.

Another aim of the present invention is the provision of a "fail safe" control means which eliminates the likelihood that batteries could be damaged during processing.

These and other objects of the present invention will become apparent from the following detailed description.

DETAILED DESCRIPTION OF THE DRAWINGS

Figure 1:
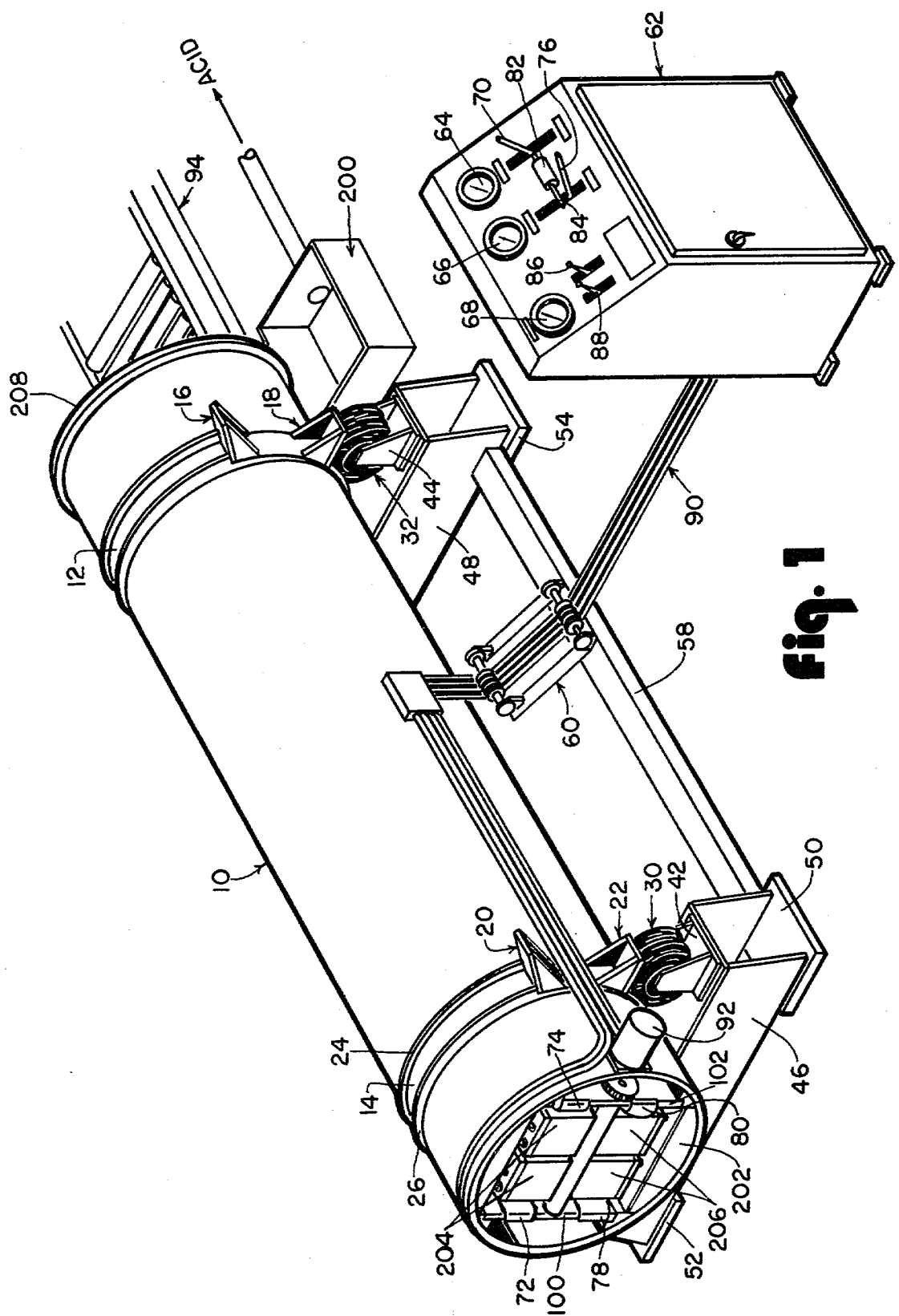
FIG. 1 is a perspective view of the preferred embodiment of the present invention.

Although specific forms of the invention have been selected for illustration in the drawings, and the following description is drawn in specific terms for the purpose of describing these forms of the invention, this description is not intended to limit the scope of the invention which is defined in the appended claims.

Figure 2:
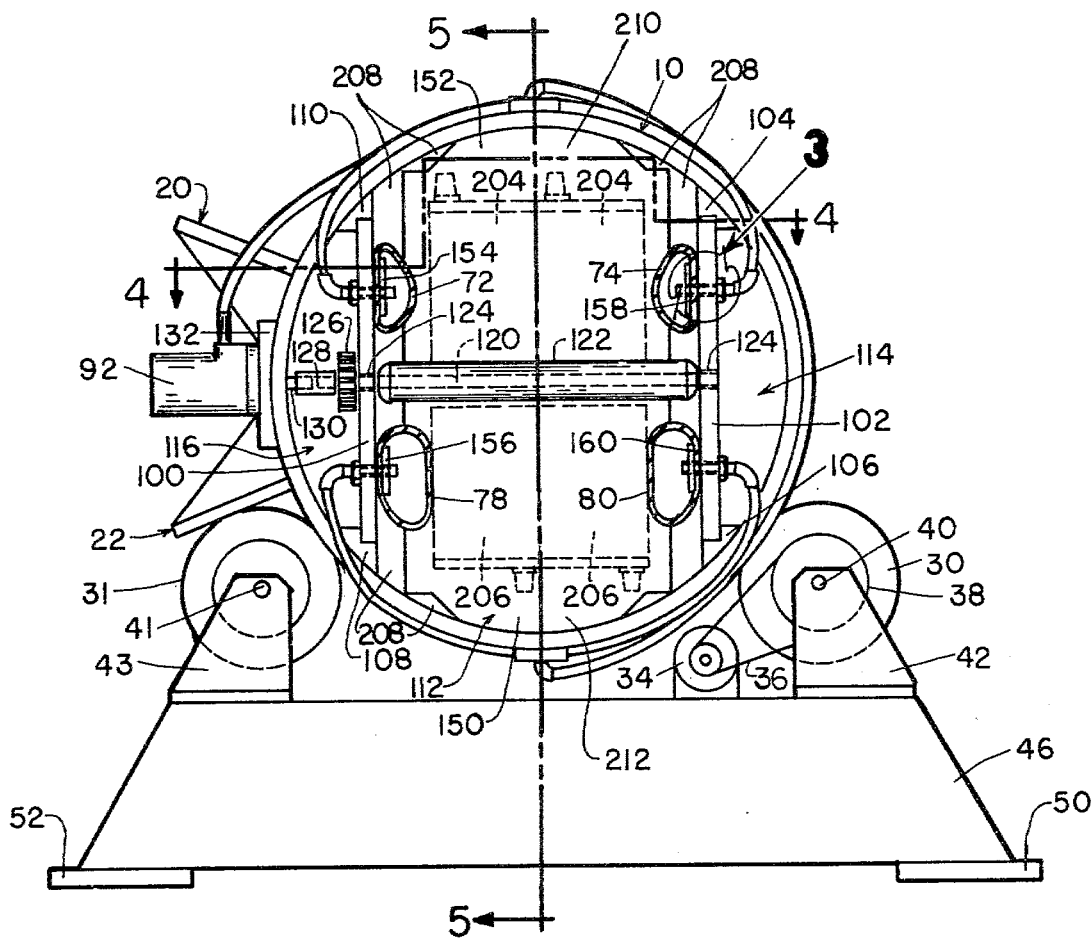
FIG. 2 is an end view taken on an enlarged scale of a preferred embodiment of the present invention similar to that illustrated in FIG. 1, with the roller conveyor motor and associated apparatus mounted on the opposite side of the tubular member from that shown in FIG. 1.

FIG. 1 is a perspective view of the preferred embodiment of the present invention showing the tubular member 10, which is composed of a substantially inert material having bands 12 and 14 disposed therearound. Mounted on these bands are bracket stops 16 and 18 on band 12 and 20 and 22 on band 14. Band 14 is further provided with upstanding flanges for engagement with longitudinal alignment means designated generally 28 shown in FIG. 5. Tubular member designated generally 10 is supported for rotation by inflatable tires 30, 31, 32 and 33, as seen in FIG. 2. At least one of these sets of tires is powered by a motor 34, by a belt 36 which may engage a pulley or other drive means disposed for rotation with the tires 30. Inflatable tires 30, 31, 32 and 33 are each mounted on axials 40 and 41 in FIG. 2, which in turn are supported by tire support brackets 42, 43, 44 and 45. These brackets are in turn mounted upon main supports 46 and 48, which are generally U-shaped members resting upon base plates 50 and 52 and 54 and 56 respectively. These main supports are aligned by longitudinal brace 58, which serves as a base for tension assembly designated generally 60. The control panel designated generally 62 is provided with pneumatic pressure indicating meter 64, 66 and 68, and a plurality of actuating control levers. As shown in FIG. 1, control lever 70 controls the degree of inflation of the upper inflatable members 72 and 74, while control lever 76, which is in the "inflated" position, controls the degree of inflation of the lower inflatable members 78 and 80. A pneumatic cylinder 82 having piston rod 84 disposed therein is seen mounted between levers 70 and 76, which cylinder and piston rod 82 and 84 automatically operates in response to activation of rotation control levers 86 and 88. Take-up means (not shown in the drawings) is connected to pneumatic lines designated generally 90, which lines are shown threaded through tension assembly designated generally 60 prior to the points of attachment of the lines to the exterior surface of tubular member designated generally 10. From this point of attachment, the lines are seen in FIG. 1 to run longitudinally along an axis parallel to tubular member designated generally 10 to the "upper" end of that tubular member wherein these pneumatic lines enter roller conveyor motor 92 for the "acid proof" channel disposed on either side of the battery processing channel, as will be described more fully herein.

Referring now to the interior of the tubular member designated generally 10, two baffles 100 and 102 are disposed in a parallel spaced apart relationship within the tubular member to form a battery processing channel within the tubular member. These baffles are longitudinally sealed to the interior of the drum by triangular brackets 104, 106, 108 and 110, which are solid pieces which extend along the entire length of their respective baffles and which are composed of an inert material such as teflon which, in addition to providing a good seal with the associated baffles and the interior of tubular member 10, also allows the baffles, and all of the structures supported thereby, to slide longitudinally within the tubular member so that individual components disposed within the tubular member designated generally 10 may be easily serviced. Referring to FIG. 2, baffles 102 and 100 are seen to form three channels within tubular member 10. A first battery processing channel designated generally 112, a second "acid free" channel designated generally 114, and a third acid free channel designated generally 116. As seen in FIG. 2, acid-free channel designated generally 116 may be considered the "upper" battery channel in that this channel, upon rotation of the tubular member 10, moves above the horizontal plane bisecting the tubular member, whereas acid-free channel 114 generally moves below that horizontal plane.

Disposed within a plane which bisects both battery processing channel 112 and baffles 100 and 102 is a conveying surface which is generally comprised of a plurality of rods 120 around which are disposed, one for each rod, a plurality of rollers 122. Each of the rods 120 pierces baffles 100 and 102 and are sealed with respect thereto by a plurality of bearings 124, two for each rod, which allow rotation of the rods while maintaining the sealed nature of battery processing channel designated generally 112. A plurality of gears 126 are disposed with "upper" battery processing channel 116 adjacent baffle 100. At least one of the plurality of rods 120 extends beyond its associated gear 126 to an acid proof removable coupling 128 which engages drive shaft 130 of roller conveyor motor 92. Roller conveyor motor 92 may be seen in FIG. 2 to be disposed on mounting plate 132 on the exterior surface of tubular member 10. An acid proof seal, not shown in the drawings, is disposed around drive shaft 130 so that a double acid proof seal is created between roller conveyor motor 92 and battery processing channel designated generally 112. Since the upper acid-free channel designated generally 116, and particularly that portion of the upper acid-free channel designated generally 116 which is disposed next to bearings 124 will be maintained, as described hereinafter, completely free from any acid contact, the chance of corrosive liquids impinging upon gears 126, coupling 128, drive shaft 130 and most particularly, upon roller conveyor motor 92, is virtually eliminated.

Figure 5:
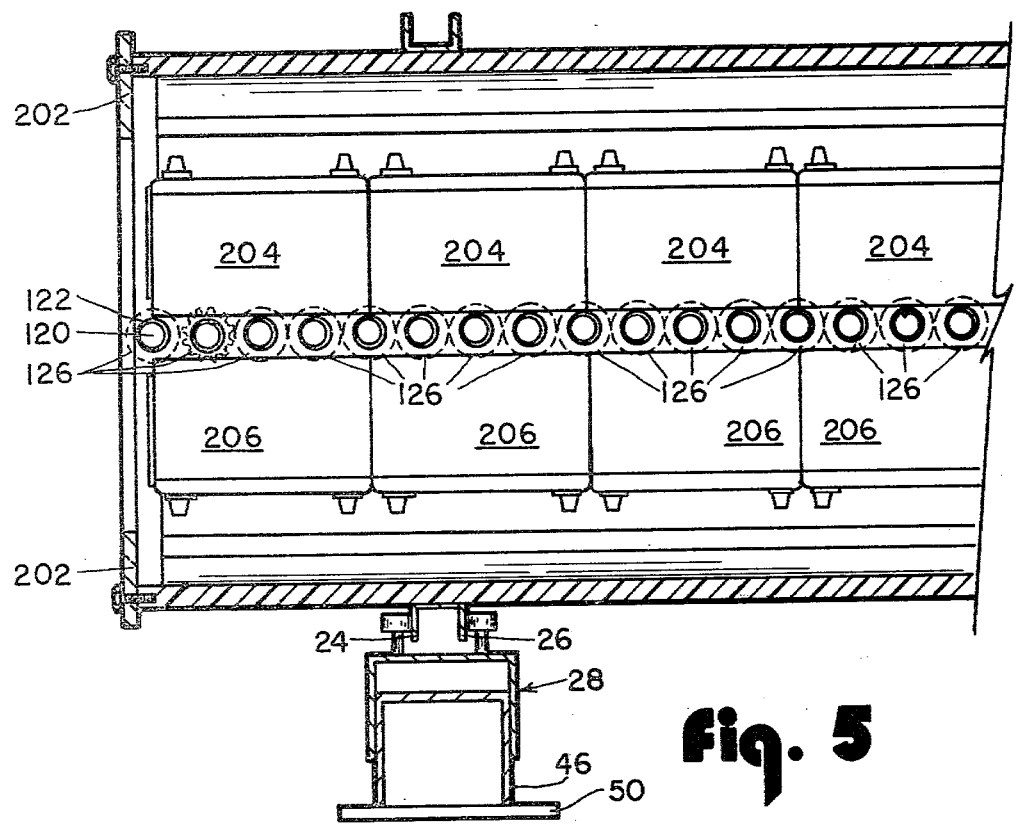
FIG. 5 is a cross section of the preferred embodiment of the present invention taken as indicated by the lines and arrows 5—5 in FIG. 2.
Figure 6:
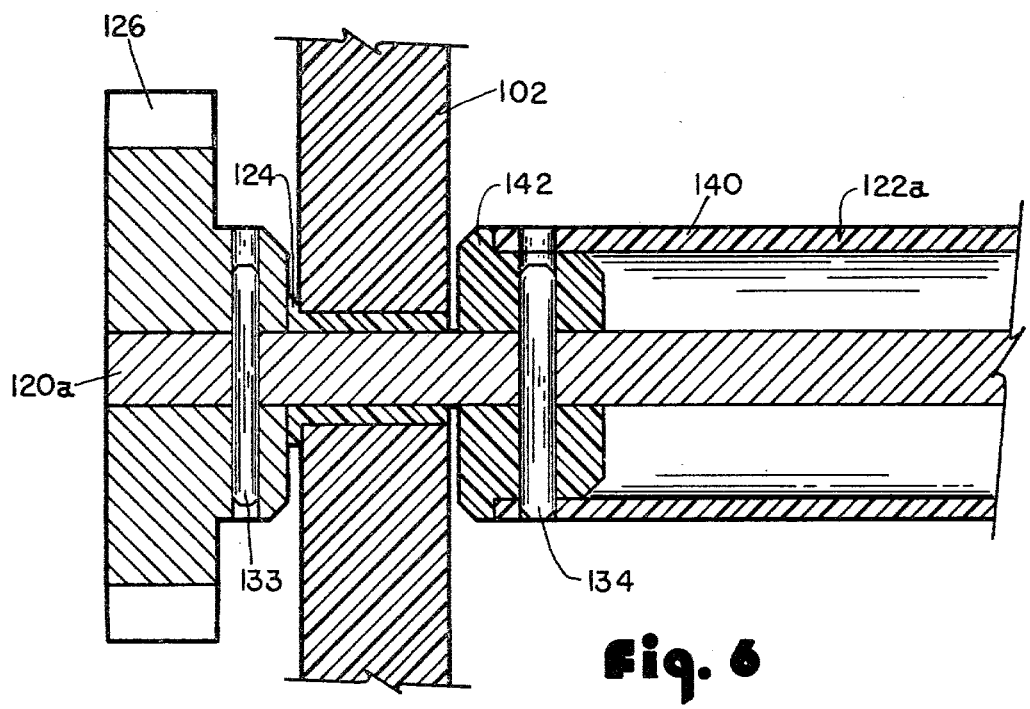
FIG. 6 is a cross section of a portion of the baffle wall showing a powered roller, which view is taken as indicated by the lines and arrows 6—6 in FIG. 4.
Figure 7:
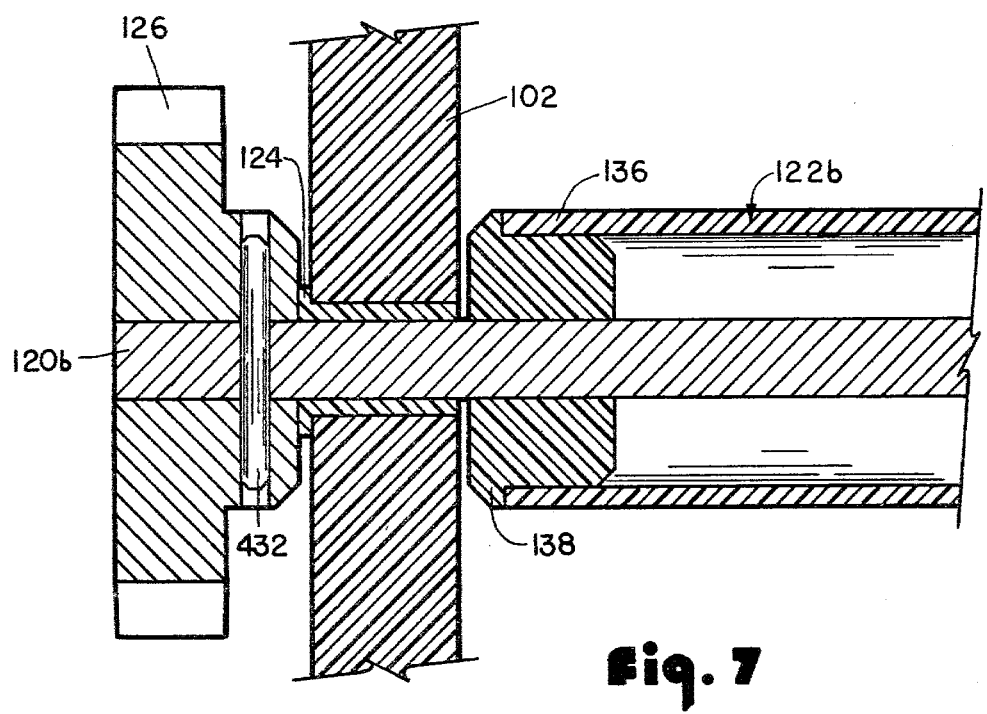
FIG. 7 is a cross section on a greatly enlarged scale similar to FIG. 6 taken as indicated by the lines and arrows 7—7 in FIG. 4 showing a freely rotating roller.

Referring now to FIGS. 6 and 7, the interrelationship between gears 126 and rollers 122 is clearly illustrated. As shown in FIG. 5, gears 126 mesh with each other so that adjacent rods 120 which are pinned thereto by pins 432 will rotate in opposite directions. In order to facilitate the introduction of batteries into and the expulsion of batteries from the apparatus of the present invention, alternate rollers 122a are pinned to alternate rods 120a by conveyor pins 134. Consequently, FIG. 6 illustrates a powered roller while FIG. 7 illustrates in cross section a freely rotating roller. In FIG. 7, the freely rotating roller designated generally 122b is shown to have an outer casing 136 which is supported by a solid bushing 138 which is allowed to rotate with respect to rod 120b. In FIG. 6, conveyor pin 134 and roller designated generally 122 pierces outer casing 140 and solid bushing 142 so that upon rotation of rod 120a roller 122a rotates therewith. FIGS. 6 and 7 also serve to illustrate the proximity of gears 126 to baffle 102, and their disposition with respect to this baffle by means of flanges formed on bearings 124. As will be discussed more fully hereinafter, the use of a single conveying surface with alternately pinned rollers provides a power conveying surface within the battery processing channel having the least possible number of moving parts which might be subject to corrosive attack. Of course, in the preferred embodiment of the present invention all materials used are selected for their resistance to corrosive attack by the particular liquids which are to be dumped from the automotive batteries processed. Examples of such materials are polypropylene, teflon, stainless steel and other materials known for their corrosion resistance to the battery processing apparatus art.

Figure 3:
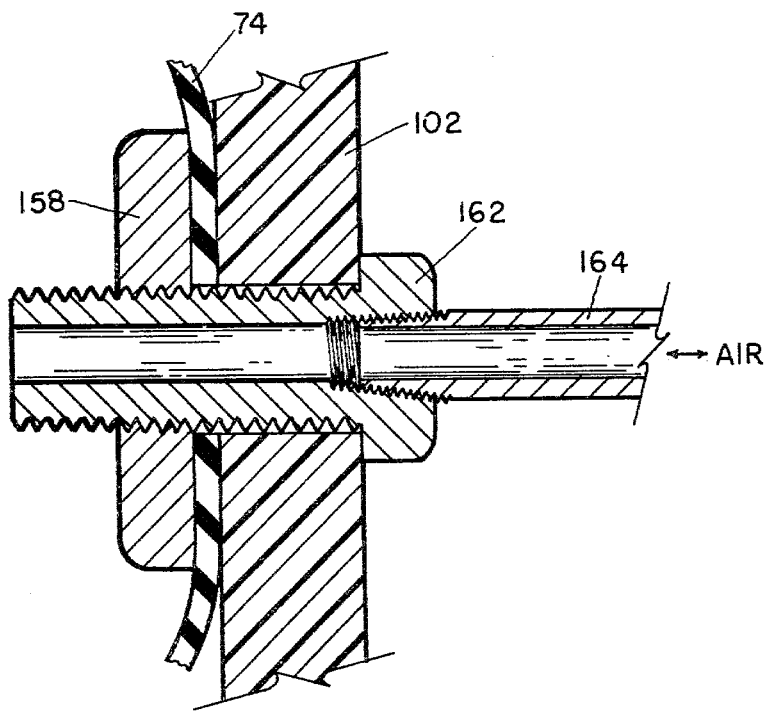
FIG. 3 is a partial cross section of a portion of the baffle wall taken as illustrated by arrow 3 in FIG. 2, which figure shows the novel pneumatic input means of the present invention.

As seen in FIG. 2, the conveying surface which bisects battery processing channel designated generally 112 bisects the battery processing channel 112 into two distinct battery receiving channels 150 and 152 which are substantial mirror images of each other. Appropriately disposed against the side walls of battery receiving channels 150 and 152 are inflatable members 78, 80 and 72,74 respectively. These inflatable members are each sealed to their adjacent baffles 100 or 102 by means of baffle plates 154, 156, 158 and 160. At at least one point along the length of these inflatable members air is introduced to a device as illustrated in FIG. 3. FIG. 3 shows baffle 102, a portion of inflatable member 74, plate 158, hollow bolt 162 and air line 164. During the construction of the apparatus inflatable members 72, 74, 78 and 80 which are tubular and initially open at their ends are threaded with plates 154, 156, 158 and 160. Once inside their respective tubular members, the composite assembly may be temporarily clamped against its associated baffles, at which time holes may be drilled and tapped to allow the introduction of a plurality of hollow or solid bolts similar to hollow bolts 162 shown in FIG. 3, the tightening of which forces plate 158 against baffle 102 as shown in FIG. 3 to tightly seal inflatable member 74 against its adjacent baffle. Air line 164 may then be threaded into the hollow bolt 162 to allow air to be introduced into the interior of inflatable member 74. This construction virtually eliminates any possibility that acid disposed within the battery processing chamber designated generally 112 could be introduced into the air lines.

Figure 8:
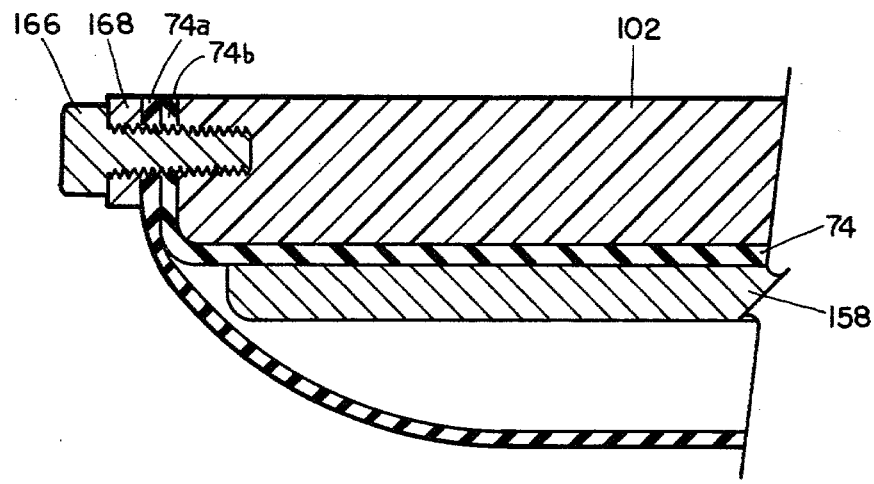
FIG. 8 is a greatly enlarged cross section showing the terminal portions of the inflatable tubular member with respect to a portion of a baffle and as indicated by the arrow 8 in FIG. 4.

Referring now to FIG. 8, once each of the baffle plates is firmly attached to its associated baffle so as to seal the inflatable member therebetween, construction of this portion of the apparatus may be completed by sealing the ends of each inflatable member against the ends of its associated baffle. FIG. 8 illustrates the configuration used to form this seal. Baffle 102 is shown in FIG. 8 by solid bolt 166 which pierces baffle end plate 168. When bolt 166 is tightened, baffle end plate 168 forces layer 74a and 74b of inflatable member 74 against the end of baffle 102 to form an airtight seal therealong.

Figure 4:
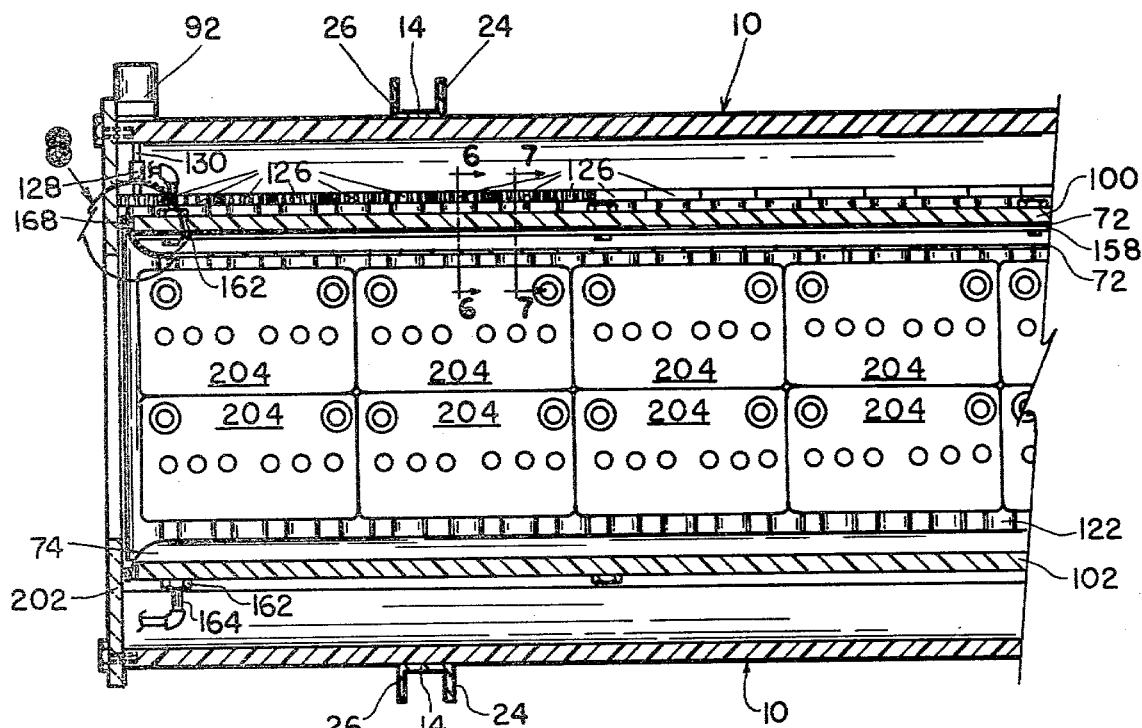
FIG. 4 is a cross sectional top view of the preferred embodiment of the present invention taken as illustrated by the lines and arrows 4—4 of FIG. 2.

In addition to the features already described, the preferred embodiment of the present invention further comprises certain capping features which are intended to allow acid to be poured from the lower end of the apparatus into a trough designated generally 200, and which similarly prevents acid from leaking from the upper ends of the apparatus. As shown in FIG. 1, the entire tubular portion is tilted slightly in one direction so that some liquid will tend to flow towards one end of the tubular member designated generally 10. The higher end of the tubular member designated generally 10 is fitted with a disc-shaped shield 202, as illustrated in FIG. 4, which shield has a rectangular cutout which allows battery 204 and 206 to pass therethrough. Shield 202, which is sealed with respect to the end of tubular member 10, prevents acid disposed within the battery processing channel from leaking out of the upper end of this channel. At the lower end of the battery processing channel a disc-shaped spout 208 similarly engages the ends of tubular member 10 with the important exception that this disc-shaped spout has a greater diameter than the outside diameter of the tubular member and further has slots or V-shaped grooves 210 and 212 disposed therein to allow discharged acid to be poured from the lower portion or the battery processing chamber into trough designated 200. Shield 202 has been removed in FIG. 2 for purposes of illustration, whereupon the cutout configuration of spout 208 is seen at the far end of tubular member 10. By creating a lip on spout 208, any acid which runs down the outside of spout 208 will be prevented from running back along the outside of tubular member 10, but will, instead, tend to drip into trough 200.

Figure 9:
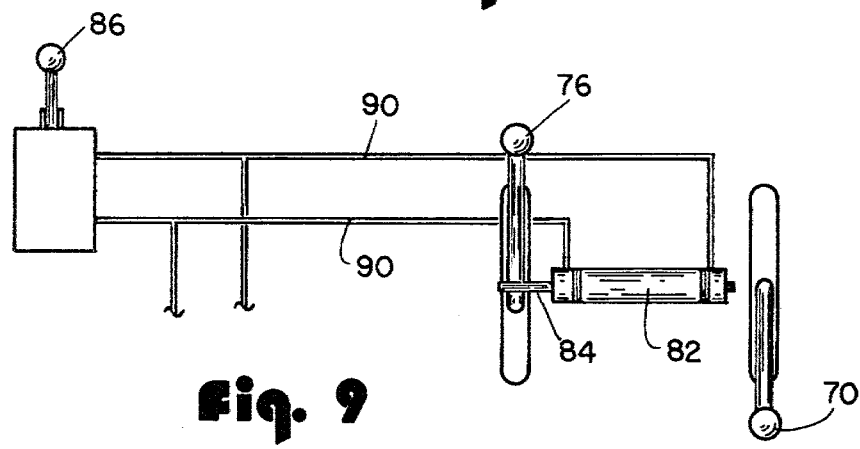
FIG. 9 is a schematic illustration of the safety interlock feature of the present invention showing the hydraulic cylinder extended in a first position.
Figure 10:
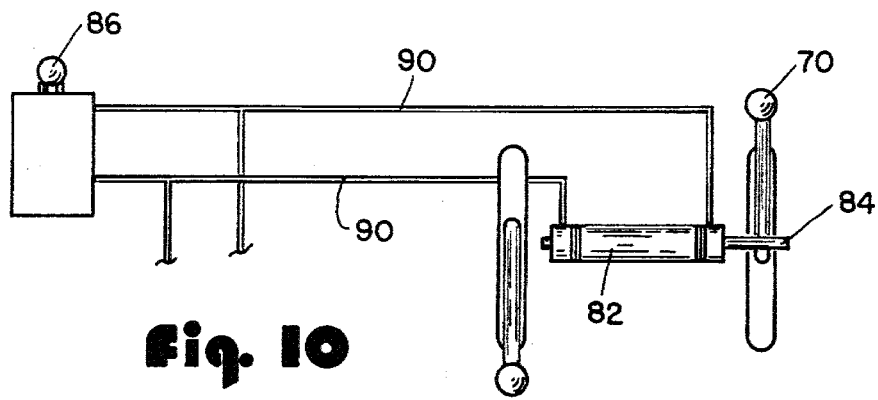
FIG. 10 is a schematic illustration of the safety interlock of the present invention showing the disposition of the piston rod of the hydraulic cylinder in its other position.

Referring now to all the figures, and particularly to FIGS. 9 and 10, the operation of the acid dumping apparatus may now be explained. In the position shown in FIG. 1, groups of batteries 204 are resting firmly upon the conveying surface, whereas groups of batteries 206 are supported entirely by inflatable members 78 and 80. Activation of the appropriate control to produce transfer of the groups of batteries 204 towards the left by activating control 88 to the conveyor motor 92 empties battery retrieving channel 150, allowing for the introduction of a second group of batteries simultaneously from conveying surface 94. These batteries, which are introduced into the apparatus filled with liquid to be dumped, may then be engaged by the inflation of inflatable members 72 and 74 by moving lever 70 into the down or "inflate" position. Once inflated, lever 86 may be activated to rotate the drum from the position shown in FIG. 1 to the position in which bracket 20 comes to rest against inflatable tire 31. Upon rotation of the tubular member to this position piston rod 84 of hydraulic cylinder 82 will be shifted to the other side to block the movement of the appropriate lever from the inflate to the deflate position. Consequently, piston rod 84 prevents those batteries which are in the down position from being dropped onto the floor of the battery processing channel by preventing the appropriate inflatable members from being deflated. At the same time, piston rod 84 is removed from interfering with the other lever, so that when batteries 206, which were formerly on the bottom, are rotated into the upper position, inflatable members 78 and 80 may be deflated to release them for subsequent exit from the processing apparatus.

Referring now to FIG. 2 and envisioning the dumping operation, it will be seen that the rotation of the drum will cause acid to begin to be dumped first towards baffle 102 and that that dumping will continue until bracket 20 engages inflatable tire 30. At this time, the cushioning effect of bracket 20 hitting tire 30 will cause the entire apparatus within tubular member 10 to shake, which shaking will be amplified by the interrelationship between the inflatable members and the batteries engaged thereby. Once in the full down position, liquid which drips from the batteries will drip directly upon the inner surfaces of the tubular member designated generally 10 for conveying down the tube and eventually into the trough. Any acid which was originally trapped between the "V" formed between the inflatable member and baffle 102 will be allowed to drain downwards and out of the apparatus into the trough. Once drainage is complete and the empty batteries in the "up" position are replaced with new full batteries to be dumped, the apparatus may again be activated. Since the apparatus is designed to rotate through an arc of only approximately 180 degrees, any residual acid remaining on the bottom of the tubular member will again be caught between the inflatable member and baffle 102 and will be trapped therebetween as the batteries assume the "up" position. This tendency of the inflatable members to trap acid in the "V" which is formed between the inflatable members and the lower baffle 102 is extremely important since acid is prevented from spilling upon those batteries which are introduced into the opposite battery receiving channel. As a result, little or no acid will splash upon the cases of the batteries being processed, nor will any battery acid be allowed to splash against the upper baffle, baffle 100, particularly in view of the fact that the inflatable members 72 and 78 which are sealed therewith will further provide dams which prevent any acid from being introduced against or splashed against the seals therein. Of course, since tubular member 10 is slightly sloped, acid which is caught in the "V" created between inflatable member 74 and 80 and baffle 102 will tend to drain towards the discharge end of tubular member 10. As a result, the above described apparatus is an extremely efficient drip-free, splash-free device which is capable of processing a large number of batteries without the attendant problems normally encountered in an acid dumping apparatus in which precautions are not taken to direct and control the flow of dumped corrosive materials.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the United States Patent and Trademark Office and is not intended to limit the scope of the invention described and claimed herein.

What is claimed is:

1. A method of draining acid from automotive storage batteries comprising the steps of:
   (a) introducing said batteries in their upright position into an acid dumping apparatus;
   (b) gripping the sides of said batteries with resilient gripping means;
   (c) swinging said apparatus through an arc in a first direction by using resilient drive means until said batteries are in their inverted position;
   (d) stopping said apparatus with said batteries in said inverted position by causing said resilient drive means to contact a stop on said apparatus thus shaking said batteries in said inverted position within said gripping members, whereby said shaking is amplified by interrelationship between said resilient gripping means and said batteries engaged thereby;
   (e) swinging said batteries back through said arc in the opposite direction; and
   (f) removing said batteries from said acid dumping apparatus.

* * * * *